United States Patent
Kim et al.

(10) Patent No.: US 9,641,817 B2
(45) Date of Patent: May 2, 2017

(54) METHOD AND SYSTEM FOR GENERATING MULTI-PROJECTION IMAGES

(71) Applicant: CJ CGV CO., LTD., Seoul (KR)

(72) Inventors: Hwan Chul Kim, Seoul (KR); Su Ryeon Kang, Goyang-si (KR); Jihyung Kang, Hwaseong-si (KR)

(73) Assignee: CJ CGV CO., LTD., Seoul (KR)

( * ) Notice: Subject to any disclaimer, the term of this patent is extended or adjusted under 35 U.S.C. 154(b) by 0 days.

(21) Appl. No.: 14/897,551

(22) PCT Filed: Dec. 9, 2014

(86) PCT No.: PCT/KR2014/012085
§ 371 (c)(1),
(2) Date: Dec. 10, 2015

(87) PCT Pub. No.: WO2015/088230
PCT Pub. Date: Jun. 18, 2015

(65) Prior Publication Data
US 2016/0142692 A1 May 19, 2016

(30) Foreign Application Priority Data

Dec. 9, 2013 (KR) ........................ 10-2013-0152604
Dec. 3, 2014 (KR) ........................ 10-2014-0172171

(51) Int. Cl.
*H04N 9/31* (2006.01)
*G03B 37/04* (2006.01)
*H04N 5/232* (2006.01)

(52) U.S. Cl.
CPC ........... *H04N 9/3185* (2013.01); *G03B 37/04* (2013.01); *H04N 5/232* (2013.01); *H04N 5/23238* (2013.01); *H04N 9/3147* (2013.01)

(58) Field of Classification Search
CPC .. H04N 5/23238; H04N 5/2258; H04N 7/181; H04N 5/2254; H04N 5/2353; H04N 13/0242; H04N 21/4307; H04N 21/21805
See application file for complete search history.

(56) References Cited

U.S. PATENT DOCUMENTS 8,059,916 B2    11/2011  Jaynes et al.
2003/0076413 A1*  4/2003  Kanade ................... G06T 15/20
                                                          348/139

(Continued)

FOREIGN PATENT DOCUMENTS

CN          2483797 Y     3/2002
CN          1765133 A     4/2006

(Continued)

OTHER PUBLICATIONS

International Search Report for PCT/KR2014/012085 mailed on Feb. 17, 2015.

(Continued)

*Primary Examiner* — Michael Teitelbaum
(74) *Attorney, Agent, or Firm* — Hauptman Ham, LLP (57) ABSTRACT

Disclosed herein is a method of generating multi-projection images. The method of generating multi-projection images includes controlling a plurality of different types of filming devices so that the filming devices are disposed at specific angles, controlling the shutter operations of the plurality of different types of filming devices in order to synchronize the plurality of different types of filming devices, and controlling the plurality of different types of filming devices so that the filming devices perform filming operations in a plurality of viewpoint directions.

17 Claims, 7 Drawing Sheets

(56) References Cited

U.S. PATENT DOCUMENTS

| | | | |
|---|---|---|---|
| 2004/0100443 A1 | 5/2004 | Mandelbaum et al. | |
| 2005/0052623 A1 | 3/2005 | Hsiung | |
| 2005/0271299 A1* | 12/2005 | Ajito | G06T 3/005 |
| | | | 382/293 |
| 2010/0260380 A1* | 10/2010 | Kaeser | G01B 11/105 |
| | | | 382/103 |

FOREIGN PATENT DOCUMENTS

| | | |
|---|---|---|
| CN | 101877767 A | 11/2010 |
| CN | 102484688 A | 5/2012 |
| JP | 2004235926 A | 8/2004 |
| JP | 2006080580 A | 3/2006 |
| KR | 1020020040919 A | 5/2002 |
| KR | 1020060083301 A | 7/2006 |

OTHER PUBLICATIONS

Chinese Office Action issued Aug. 16, 2016 in connection with Chinese Patent Application No. 201480035308.8.

* cited by examiner

<Rear view>

<Plan view>

METHOD AND SYSTEM FOR GENERATING MULTI-PROJECTION IMAGES

CROSS REFERENCE TO RELATED APPLICATION

This application claims the priority of Korean Patent Application No. 10-2013-0152604 filed on Dec. 9, 2013 and Korean Patent Application No. 10-2014-0172171 filed on Dec. 3, 2014 in the Korean Patent and Trademark Office. Further, this application is the National Phase application of International Application No. PCT/KR2014/012085 filed on Dec. 9, 2014, which is incorporated herein by reference in its entirety.

TECHNICAL FIELD

The present invention relates to a method and system for generating multi-projection images and, more particularly, to a method and system, wherein a plurality of different types of filming devices is disposed at specific angles, the shutter operations of the plurality of different types of filming devices are synchronized, images in a plurality of viewpoint directions are obtained using the plurality of different types of filming devices, and so-called "multi-projection images" are generated using the obtained images.

BACKGROUND ART

In a prior art, in order to play back an image, such as a movie or an advertisement in a theater, a two-dimensional (2D) image is projected on a single screen disposed at the front of a movie theater. In such a system, audiences inevitably experience only the 2D image.

3D image-related technologies capable of providing stereoscopic images to audience have recently been developed. A 3D image technology is based on a principle that when different images enter the left eye and right eye of a person and are merged in the brain, the person perceives the merged images as a 3D image. In such a 3D image technology, two cameras on which different polarization filters are mounted are used to capture images. When watching an image, a person wears glasses on which polarization filters are mounted so that different images enter the left eye and right eye of the person.

However, such a 3D technology may provide a stereoscopic image to a user, but is problematic in that a degree of immersion for an image itself played back in a single screen is low because the user merely watches the image. Furthermore, there is a problem in that the direction of a 3D effect felt by audiences is limited to the direction in which a single screen is disposed.

Furthermore, a conventional 3D technology is problematic in that it may cause inconvenience for audiences who watch images because the audiences must wear glasses on which polarization filters are mounted and that a sensitive user may feel dizzy or sick because different images are forced to enter the left eye and right eye of the user.

Accordingly, a so-called "multi-projection system" capable of solving the problems of the conventional screening system based on a single screen was proposed. In this case, the "multi-projection system" means a technology for disposing a plurality of projection planes (or a plurality of display devices) around the seats for the audience and playing back synchronized images having a sense of unity on the plurality of projection planes (or the plurality of display devices) so that audiences may have a 3D effect and a sense of immersion.

In order to maximize a sense of immersion and a 3D effect felt by audiences using such as a "multi-projection system", images matched with the viewpoint directions of respective projection planes (or respective display devices) need to be played back on a plurality of the projection planes (or a plurality of the display devices) disposed around the seats for the audience.

Figure 1:
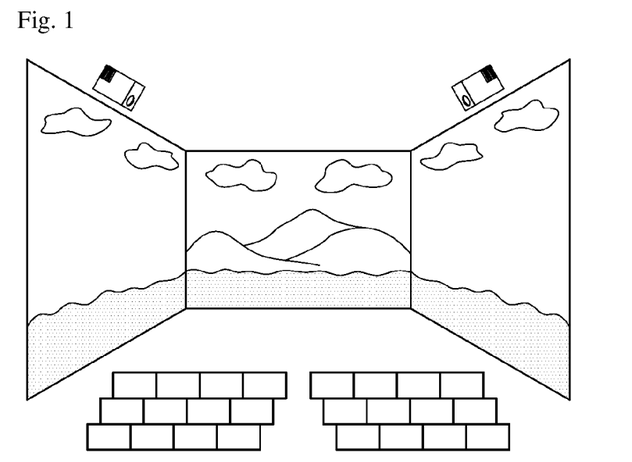
FIG. 1 is an exemplary diagram illustrating an example of a multi-projection system.

For example, assuming that there is a movie theater in which a plurality of projection planes (or a plurality of display devices) is disposed at the front and on the left and right sides of the seats for the audience as illustrated in FIG. 1, an image matched with a viewpoint that views the front on the basis of the seats for the audience needs to be played back the projection plane (or the display device) at the front, an image matched with a viewpoint that views the left on the basis of the seats for the audience needs to be played back in the projection plane (or the display device) on the left side, and an image matched with a viewpoint that views the right on the basis of the seats for the audience needs to be played back in the projection plane (or the display device) on the right side.

In a prior art, however, there is no technology for generating so-called "multi-projection images" that will be played back in a plurality of projection planes (or a plurality of display devices) of such a "multi-projection system".

Accordingly, there is a need for the development of a new technology capable of solving such a technical need.

The present invention has been invented based on such a technical background and has been invented to satisfy the aforementioned technical need and also to provide additional technical elements that may not be easily invented by those skilled in the art.

SUMMARY OF INVENTION

Technical Problem

Accordingly, the present invention has been made in view of the above problems, and it is an object of the present invention to provide a technology for generating so-called "multi-projection images" to be played back in a plurality of projection planes (or a plurality of display devices) disposed in a plurality of viewpoint directions around the seats for the audience.

Technical objects to be achieved by the present invention are not limited to the aforementioned object, and they may include various technical objects that are evident to those skilled in the art from the following description.

Solution to Problem

In accordance with an aspect of the present invention, a method of generating multi-projection images includes controlling a plurality of different types of filming devices so that the filming devices are disposed at specific angles, controlling the shutter operations of the plurality of different types of filming devices in order to synchronize the plurality of different types of filming devices, and controlling the plurality of different types of filming devices so that the filming devices perform filming operations in a plurality of viewpoint directions.

Furthermore, in the method of generating multi-projection images, in disposing the plurality of different types of filming devices, the plurality of different types of filming devices forms an angle of view of 270 degrees or more.

In this case, the plurality of different types of filming devices is disposed so that the angles of view of adjacent filming devices are overlapped.

Furthermore, an overlap region between the angles of view of the adjacent filming devices may be 13% to 17% of the total angle of view of each of the filming devices.

In the method of generating multi-projection images, the plurality of different types of filming devices may be installed in a plurality of sliding bases and disposed at the specific angles through relative motions between the plurality of sliding bases.

Furthermore, in the method of generating multi-projection images, the plurality of different types of filming devices may include a main filming device disposed at the center, two filming devices disposed on a left side of the main filming device, and two filming devices disposed on a right side of the main filming device.

In this case, if a focal distance of the main filming device is increased, the plurality of different types of filming devices may be disposed again so that an included angle between the main filming device and a filming device on the left side and an included angle between the main filming device and a filming device on the right side are reduced.

Furthermore, in the method of generating multi-projection images, the focal distance of the main filming device may be 24 mm, and the focal distance of each of the filming device on the left side and the filming device on the right side may be 16 mm.

In the method of generating multi-projection images, in controlling the shutter operations, if the plurality of different types of filming devices has different operation speeds, start the shutter signals may be transmitted to the plurality of different types of filming devices with a time lag. In this case, the time lag between the start the shutter signals transmitted to the plurality of different types of filming devices may be computed by taking into consideration at least one of the signal processing speed of a Central Processing Unit (CPU) included in each filming device, a network transfer speed used by each filming device when data is transmitted and received, and the processing speed of a rolling shutter between the filming devices.

The method of generating multi-projection images may further include mapping images captured by the plurality of different types of filming devices to a spherical space or cylindrical space and generating images of respective planes.

In this case, mapping the images may include converting the color spaces and formats of the images captured by the plurality of different types of filming devices into a united form.

In accordance with another aspect of the present invention, a system for generating multi-projection images includes a plurality of different types of filming devices disposed at specific angles and configured to perform filming operations in a plurality of viewpoint directions in the state in which the different types of filming devices have been synchronized and a synchronization control device configured to synchronize the plurality of different types of filming devices by controlling the shutter operations of the plurality of different types of filming devices.

Furthermore, in the system for generating multi-projection images, adjacent filming devices of the plurality of different types of filming devices may be disposed to form a specific included angle, and all of the plurality of different types of filming devices may implement an angle of view of 270 degrees or more.

Furthermore, the system for generating multi-projection images may further include a plurality of sliding bases configured to have the plurality of different types of filming devices installed in the respective sliding bases and a rig configured to have the plurality of sliding bases rotatably movable in the rig. The plurality of different types of filming devices is disposed at the specific angles through relative motions between the plurality of sliding bases.

Furthermore, in the system for generating multi-projection images, the rig may include a base plate configured to form a basic body and a plurality of punched units formed in the base plate and configured to have the plurality of sliding bases movable in the punched units.

On the one hand, in the system for generating multi-projection images, the plurality of different types of filming devices may include a main filming device disposed at the center, two filming devices disposed on the left side of the main filming device, and two filming devices disposed on the right side of the main filming device.

On the other hand, the system for generating multi-projection images may further include an image processing device configured to map images, captured by the plurality of different types of filming devices, to a spherical space or cylindrical space and to generate images of respective planes.

In this case, the image processing device may be implemented to convert the color spaces and formats of the images, captured by the plurality of different types of filming devices, into a united form and perform the mapping operation.

Advantageous Effects of Invention

The present invention can generate so-called "multi-projection images" that are played back on the plurality of projection planes (or the plurality of display devices) of the "multi-projection system" and that are capable of improving a 3D effect and a sense of immersion felt by audiences. More specifically, in accordance with the present invention, a plurality of different types of filming devices is disposed at specific angles, and the shutter operations of the plurality of different types of filming devices are synchronized. Accordingly, images in a plurality of viewpoint directions that have an improved 3D effect and sense of immersion felt by audiences can be obtained, and "multi-projection images" can be generated based on the obtained images in the plurality of viewpoint directions.

Furthermore, the present invention can generate "multi-projection images" capable of maximizing a sense of immersion felt by audiences using a plurality of different types of filming devices. More specifically, the present invention can implement an integrated angle of view of 270 degrees or more in the state in which the angles of view of adjacent filming devices are overlapped by disposing a plurality of different types of filming devices at specific angles and can generate "multi-projection images" capable of maximizing a sense of immersion felt by audiences based on the integrated angle of view of 270 degrees or more.

Furthermore, the present invention can control the viewpoint directions of multi-projection images and an integrated angle of view implemented by a plurality of different types of filming devices by controlling included angles between the plurality of different types of filming devices. More specifically, in accordance with the present invention, the plurality of sliding bases capable of a rotary motion is installed in the rig, a plurality of different types of filming devices is installed in the plurality of sliding bases, and included angles between the plurality of different types of filming devices are controlled. Accordingly, the viewpoint directions of multi-projection images and an integrated angle of view implemented by the plurality of different types of filming devices can be controlled.

Furthermore, the present invention can generate multi-projection images optimized for respective focal distance although the focal distance of a main filming device is changed in a filming process. More specifically, the present invention can generate multi-projection images optimized for respective focal distances by controlling included angles between a plurality of different types of filming devices in response to a change in the focal distance of the main filming device.

Furthermore, the present invention can generate multi-projection images optimized for the structure of a movie theater based on images captured by the plurality of different types of filming devices. More specifically, the present invention can generate multi-projection images optimized for the structure of a movie theater by mapping images captured by a plurality of different types of filming devices to a spherical space or cylindrical space and generating the multi-projection images corresponding to the movie theater using the mapped images.

Technical effects of the present invention are not limited to the aforementioned effects, and they may include various effects that are evident to those skilled in the art from the following description.

DESCRIPTION OF REFERENCE NUMERALS

110 main filming device
120 filming device on the left side
130 filming device on the right side 240 rig
242 base plate 244 punched unit
210 220 230 sliding base
300 synchronization control device
400 image processing device Mode for the Invention Hereinafter, a method and system for generating multi-projection images" in accordance with embodiments of the present invention are described in detail with reference to the accompanying drawings. The embodiments to be described are provided in order for those skilled in the art to easily understand the technical spirit of the present invention, and the present invention is not limited to the embodiments. Furthermore, matters represented in the accompanying drawings have been diagrammed in order to easily describe the embodiments of the present invention, and the contents may be different from forms that are actually implemented.

Each of the elements represented herein is only an example for implementing the embodiments of the present invention. Accordingly, in other implementations of the present invention, different elements may be used without departing from the spirit and scope of the present invention. Furthermore, each element may be purely formed of a hardware or software element, but may also be implemented using a combination of various hardware and software elements that perform the same function.

Furthermore, an expression that some elements are "included" is an expression of an "open type", and the expression simply denotes that the corresponding elements are present, but it should not be understood that additional elements are excluded.

Furthermore, an expression of a "multi-projection image" means an image that is played back through a plurality of projection planes (or a plurality of display devices) disposed around the seats for the audience and that is capable of improving a sense of immersion and 3D effect felt by audiences.

A method of generating multi-projection images in accordance with an embodiment of the present invention is described below with reference to FIGS. 2 to 10.

Figure 2:
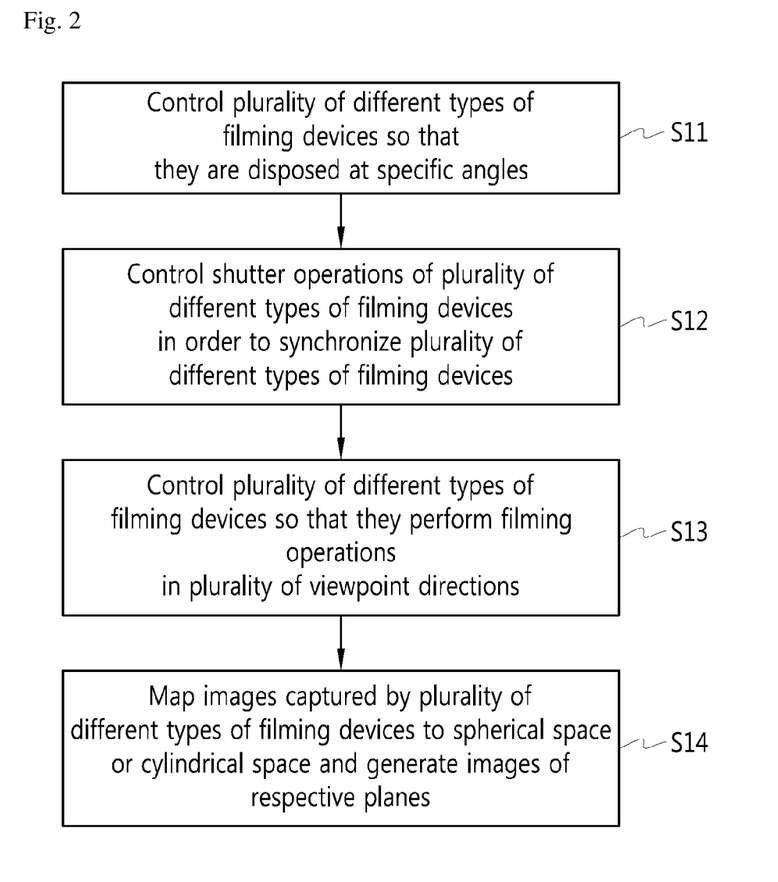
FIG. 2 is a flowchart illustrating a method of generating multi-projection images in accordance with an embodiment of the present invention.

Referring to FIG. 2, the method of generating multi-projection images in accordance with an embodiment of the present invention may include controlling a plurality of different types of filming devices so that they are disposed at specific angles at step S11, controlling the shutter operations of the plurality of different types of filming devices in order to synchronize the plurality of different types of filming devices at step S12, controlling the plurality of different types of filming devices so that they perform filming operations in a plurality of viewpoint directions at step S13, and mapping images captured by the plurality of different types of filming devices to a spherical space or cylindrical space and generating images of respective planes at step S14.

At step S11, the plurality of different types of filming devices configured to perform filming operations in the plurality of viewpoint directions is controlled so that they are disposed at specific angles.

Figure 3:
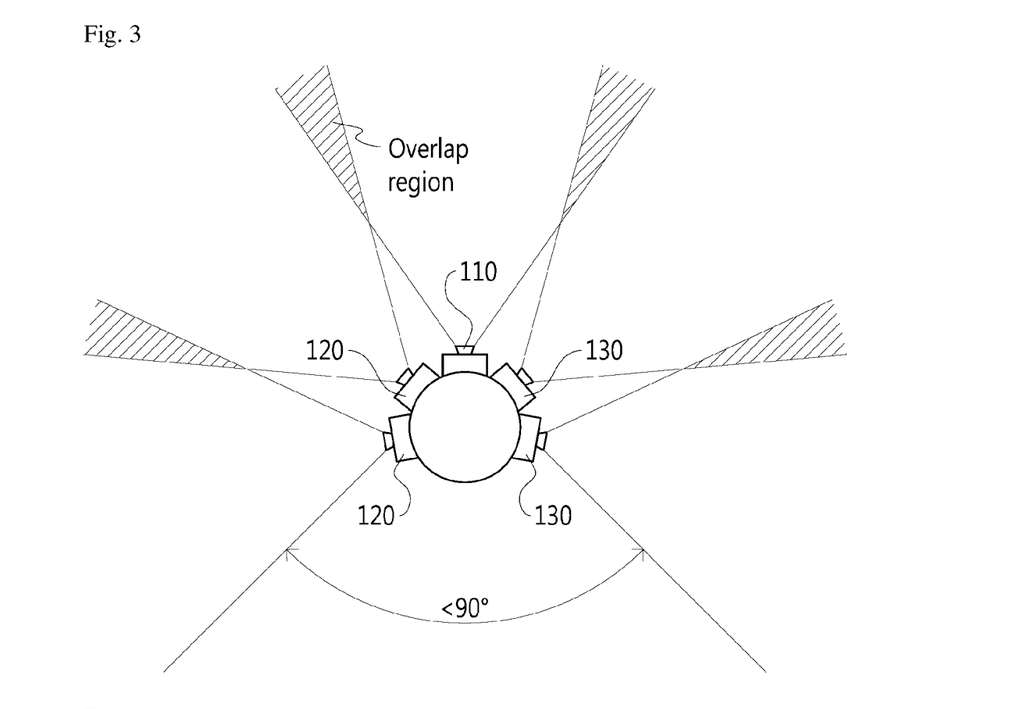
FIG. 3 is an exemplary diagram illustrating an example of a plurality of different types of filming devices in accordance with an embodiment of the present invention.

In this case, the meaning that the plurality of different types of filming devices is controlled so that they are disposed at the specific angles means that adjacent ones of filming devices forming the plurality of different types of filming devices are driven in response to a control command so that they are disposed to form a specific included angle. For example, this means that adjacent ones of filming devices that form the plurality of different types of filming devices are disposed to form a specific included angle in response to a control command, as illustrated in FIG. 3.

Furthermore, the subject that controls the plurality of different types of filming devices so that they form a specific angle may be hardware having an operation processing ability. Such hardware may be independently present in a separate device form, for example, as a disposition control device. Such a control function may be performed by the synchronization control device to be described later.

Furthermore, the plurality of different types of filming devices means a filming device group including different types of filming devices. For example, the plurality of different types of filming devices may mean a filming device group that includes different types of filming devices, such as RED Epic and 5D Mark2. The plurality of different types of filming devices may include 5 filming devices. More specifically, the plurality of different types of filming devices may include a main filming device disposed at the center, two filming devices disposed on the left side of the main filming device, and two filming devices disposed on the right side of the main filming device. FIG. 3 illustrates that the plurality of different types of filming devices is implemented to include a main filming device disposed at the center, two filming devices disposed on the left side, and two filming devices disposed on the right side.

Furthermore, at step S11, the plurality of different types of filming devices may be disposed so that the angles of view of adjacent filming devices are overlapped. The reason for this is that if the angles of view of adjacent filming devices are overlapped, images captured by the adjacent filming devices can be overlapped and information about a relative relationship between the images captured by the different types of filming devices can be computed based on information about the overlap of the images. From FIG. 3, it may be seen that the plurality of different types of filming devices includes a main filming device 110, two filming devices 120 on the left side, and two filming devices 130 on the right side and the plurality of different types of filming devices is disposed so that the angles of view of adjacent filming devices 110-120, 120-120, 110-130, and 130-130 are overlapped. In this case, a region overlapped by adjacent filming devices may be different depending on the places where the filming devices are installed or lenses, but the filming devices may be disposed so that the region is 13~17%.

In a method of determining the overlap region of captured images, the following geometric criterion may be used.

Figure 4:
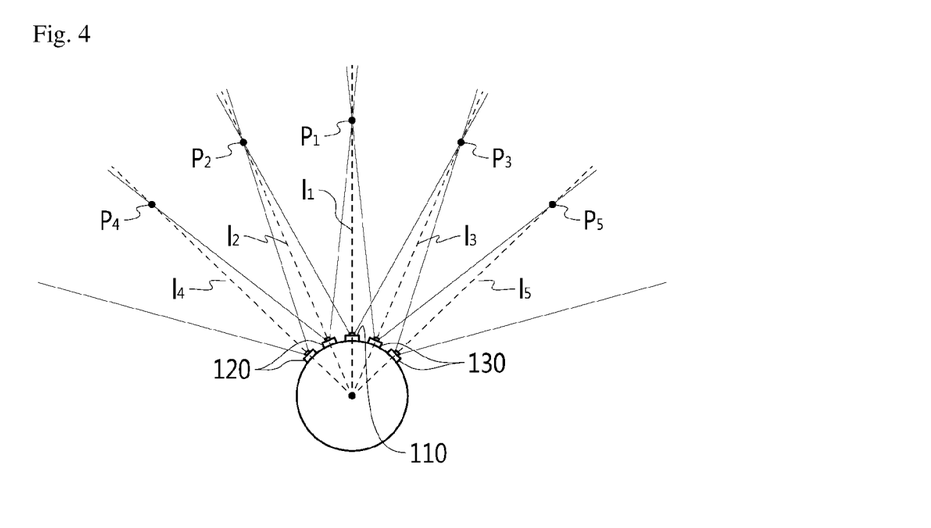
FIG. 4 is an exemplary diagram illustrating a process of disposing the plurality of different types of filming devices in accordance with an embodiment of the present invention.

As illustrated in FIG. 4, when the plurality of filming devices 110, 120, and 130 is viewed at the plane, points $P_1$ to $P_s$ at the same distance from the respective filming devices, for example, a distance of 10 m from the lenses of the respective filming devices in respective straight-line axes $1_1$ to $1_5$ that pass through the centers of the filming devices are determined. Furthermore, the filming devices are disposed so that two segments of a line that form the angle of view of each filming device and that are placed on the left side and right of the filming device pass through one point in the straight-line axis of the filming device.

If the filming devices are disposed as in FIG. 4, a filming image region overlapped between the filming devices can be regularly maintained and a ratio of the overlap region can be controlled based on the location of each point.

At step S11, the plurality of different types of filming devices may be disposed so that they implement an angle of view of 270 degrees or more. The reason for this is that only when the plurality of different types of filming devices implements an angle of view of 270 degrees or more, a screen of 270 degrees or more can be provided to audiences through multi-projection images and thus a 3D effect and a sense of immersion felt by the audiences can be maximized. From FIG. 3, it may be seen that the main filming device 110, the two filming devices 120 on the left side, and the two filming devices 130 on the right side implement an angle of view of 270 degrees or more.

Furthermore, at step S11, included angles between the plurality of different types of filming devices (i.e., an included angle between adjacent filming devices) may be controlled depending on the focal distance of a specific filming device. For example, if the plurality of different types of filming devices is implemented to include a main filming device, two filming devices on the left side, and two filming devices on the right side as illustrated in FIG. 3, included angles between the plurality of different types of filming devices may be controlled depending on the focal distance of the main filming device. More specifically, 1) if the focal distance of the main filming device is increased, the plurality of different types of filming devices may be disposed again so that an included angle between the main filming device and a filming device on the left side, an included angle between the main filming device and a filming device on the right side, an included angle between the filming devices on the left side, and an included angle between the filming devices on the right side are decreased. Furthermore, 2) if the focal distance of the main filming device is decreased, the plurality of different types of filming devices may be disposed again so that an included angle between the main filming device and a filming device on the left side, an included angle between the main filming device and a filming device on the right side, an included angle between the filming devices on the left side, and an included angle between the filming devices on the right side are increased. Simulations revealed that when the focal distance of the main filming device 110 and the focal distance of the left and right filming devices 120 and 130 are set to 24 mm and 16 mm, there are advantages in that the subsequent editing of an image is facilitated because a filming region is widened and a sense of visual stability is provided to audiences.

The focal distance of the main filming device 110, the length of a blind spot occurring when captured images are overlapped according to an included angle formed by filming devices, and the difficulty of a so-called stitching task, that is, a task for editing an overlap region, are described below.

TABLE 1

| Focal distance (mm) | Camera angle (°) | Length of blind spot (m) | Difficulty of stitching |
|---|---|---|---|
| 24 | 59 | 10 | ● |
| 24 | 58 | 5 | ●● |
| 24 | 56 | 3.5 | ●●●● |
| 24 | 55 | 2 | ●●●●● |

TABLE 2

| Focal distance (mm) | Camera angle (°) | Length of blind spot (m) | Difficulty of stitching |
|---|---|---|---|
| 32 | 46 | 12 | ● |
| 32 | 45 | 6 | ●● |

TABLE 2-continued

| Focal distance (mm) | Camera angle (°) | Length of blind spot (m) | Difficulty of stitching |
|---|---|---|---|
| 32 | 44 | 3.5 | ●●● |
| 32 | 43 | 2.5 | ●●●● |

TABLE 3

| Focal distance (mm) | Camera angle (°) | Length of a blind spot (m) | Difficulty of stitching |
|---|---|---|---|
| 40 | 37 | 8.5 | ● |
| 40 | 36 | 5 | ●● |
| 40 | 35 | 3 | ●●● |
| 40 | 34 | 2.5 | ●●●● |

TABLE 4

| Focal distance (mm) | Camera angle (°) | Length of a blind spot (m) | Difficulty of stitching |
|---|---|---|---|
| 50 | 30 | 11 | ● |
| 50 | 29 | 5 | ●● |
| 50 | 28 | 3.5 | ●●● |
| 50 | 27 | 2.5 | ●●●● |

Tables 1 to 4 illustrate classifications according to the focal distance of the main filming device. Each table illustrates the lengths of blind spots occurring when images are overlapped according to included angles between the filming devices and the difficulties of stitching tasks due to the lengths of the blind spots.

From Tables 1 to 4, it may be seen that an included angle between the filming devices is gradually decreased if the focal distance of the main filming device is increased and an included angle between the filming devices is gradually increased if the focal distance of the main filming device is decreased as described above. That is, if the focal distance of the main filming device is 24 mm, each filming device is disposed to have an included angle of 50 to 60 degrees. In contrast, if the focal distance of the main filming device is 50 mm, each filming device is disposed to have an included angle of 20 to 30 degrees.

From the tables, it may be seen that assuming that the focal distance of the main filming device is fixed to a specific value, if an included angle formed by filming devices is decreased, the length of a blind spot occurring when images are overlapped is reduced.

Figure 5:
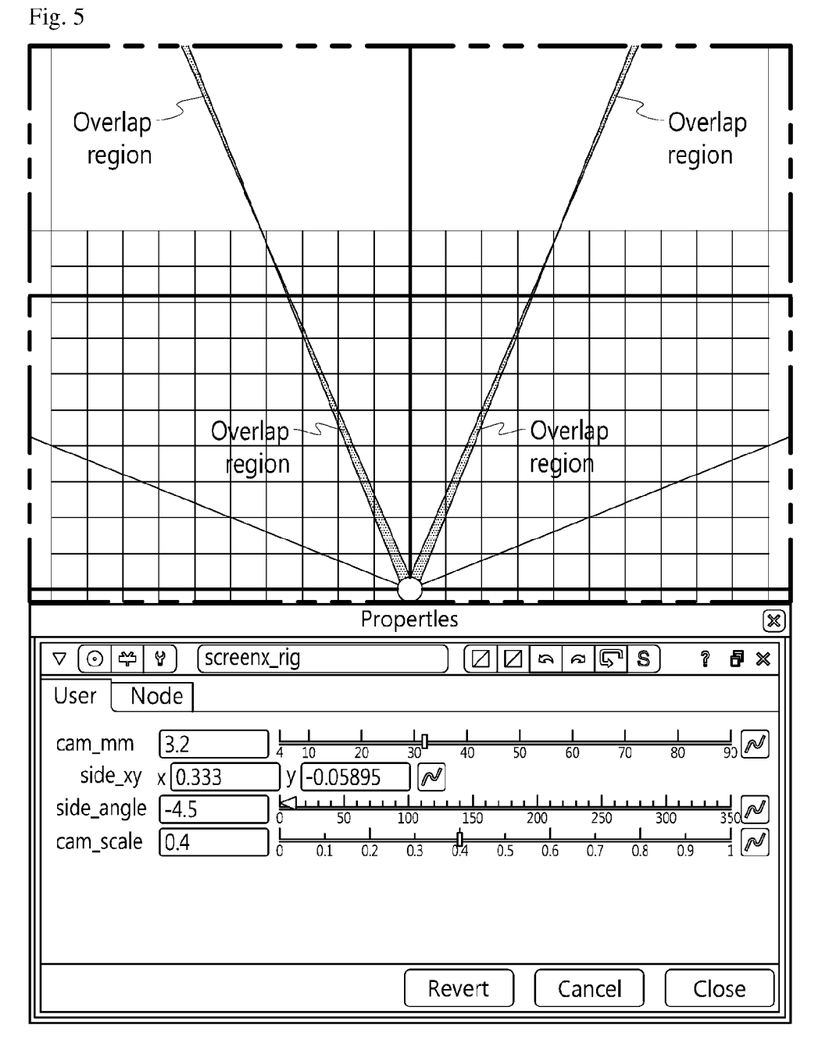
FIGS. 5 and 6 illustrate the overlap regions of angles of view occurring due to the focal distances and included angles of filming devices.

FIG. 5 illustrates included angles formed by the filming devices and the lengths of blind spots occurring when angles of view of the filming devices are overlapped. In particular, in FIG. 5, it is assumed that the focal distance of the main filming device is 32 mm and an included angle between the filming devices is 45 degrees.

A blind spot is generated when images captured by the plurality of filming devices are overlapped. The blind spot is generated due to the presence of an included angle formed by the filming devices and because the angles of view of the filming devices are not precisely matched.

Furthermore, from FIG. 5, it may be seen that the width of a blind spot region is increased, but the length of the blind spot is reduced if the size of an included angle between the filming devices is increased and the width of a blind spot region is reduced, but the length of the blind spot is increased if the size of an included angle between the filming devices is reduced.

The length of a blind spot region is related to a task for editing images captured by the plurality of filming devices, that is, a so-called stitching task. The stitching task refers to a task for editing images of the respective filming devices into a single screen. The stitching task is performed by a process of bringing the left and right faces of images into contact with each other. As the length of the blind spot region is increased when such a stitching task process is taken into consideration, that is, as the width of the blind spot region is narrowed, the stitching task is further facilitated because an image data load for editing is reduced from a viewpoint of a worker. As described above, from Tables 1 to 4 and FIG. 5, it may be seen that the difficulty of the stitching task is reduced as the length of a blind spot region is increased, that is, as the width of the blind spot region is reduced.

TABLE 5

| Focal distance (mm) | Camera angle (°) | Blind spot (m) |
|---|---|---|
| 24 | 60 | uniform |
| 32 | 47 | uniform |
| 40 | 38 | uniform |
| 50 | 31 | uniform |

Table 5 illustrates that a blind spot region having a uniform width is generated the main filming device and the filming devices on the left side and right form a specific included angle.

Figure 6:
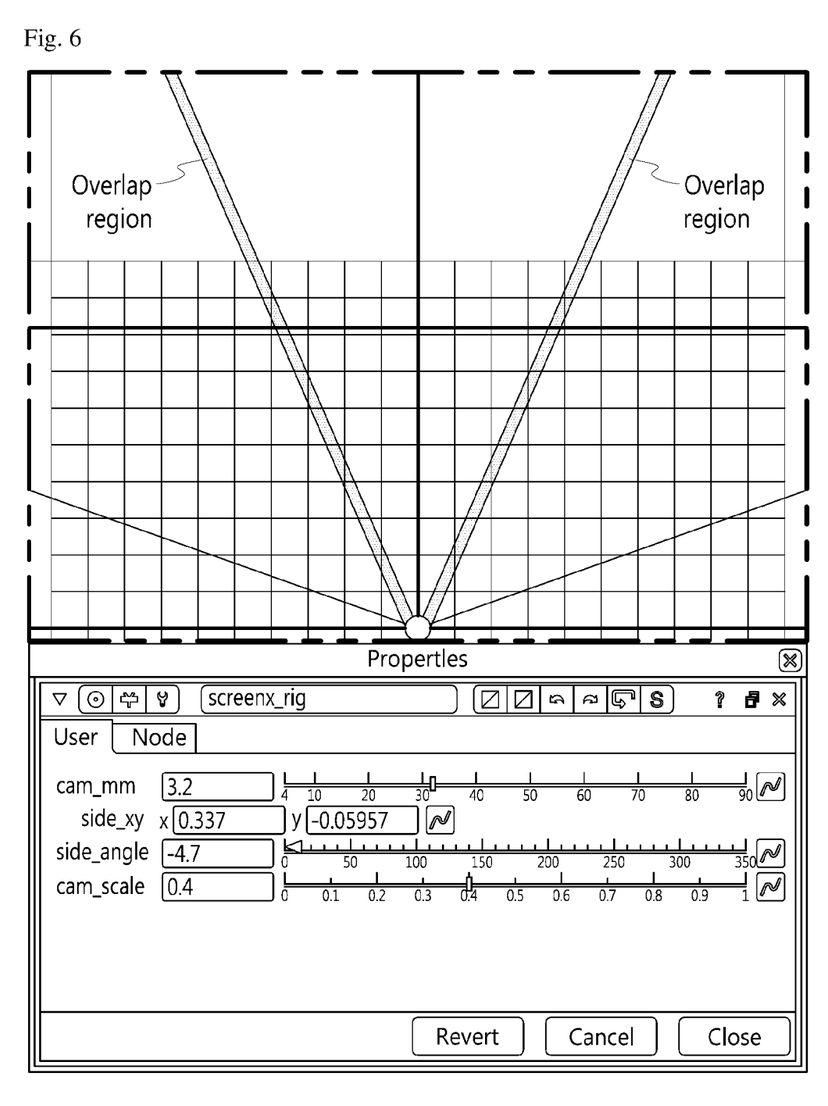

FIG. 6 illustrates the angles of view and blind spot regions of filming devices when the focal distance of the main filming device is 32 mm and an included angle between the filming devices is 47 degrees. From FIG. 6, it may be seen that blind spot regions having a uniform width and not having a point of intersection are generated because segments of a line that form the angles of view of the filming devices go straight in parallel in a specific filming environment. If the focal distance and included angle of each filming device are set so that the blind spot region has uniform width as described above, there is an advantage in that the editing of a captured image becomes further facilitated. Furthermore, at step S11, the operation of disposing the plurality of different types of filming devices at specific angles (i.e., the adjacent filming devices are disposed to form a specific included angle) may be implemented using various methods. The operation may be implemented by the structural characteristics of a plurality of sliding bases in which the plurality of different types of filming devices is installed and a rig in which the plurality of sliding bases is formed to be rotatably moved.

Figure 7:
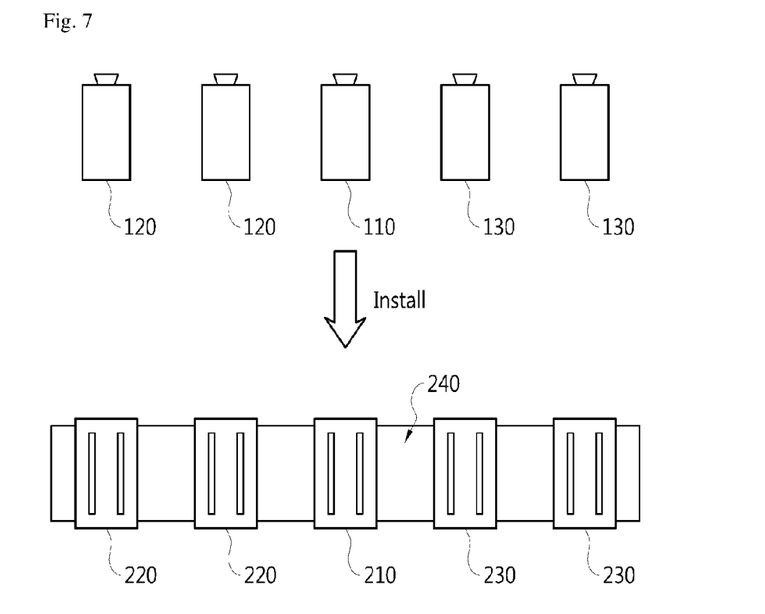
FIG. 7 is an exemplary diagram illustrating a plurality of sliding bases and a rig in accordance with an embodiment of the present invention.
Figure 8:
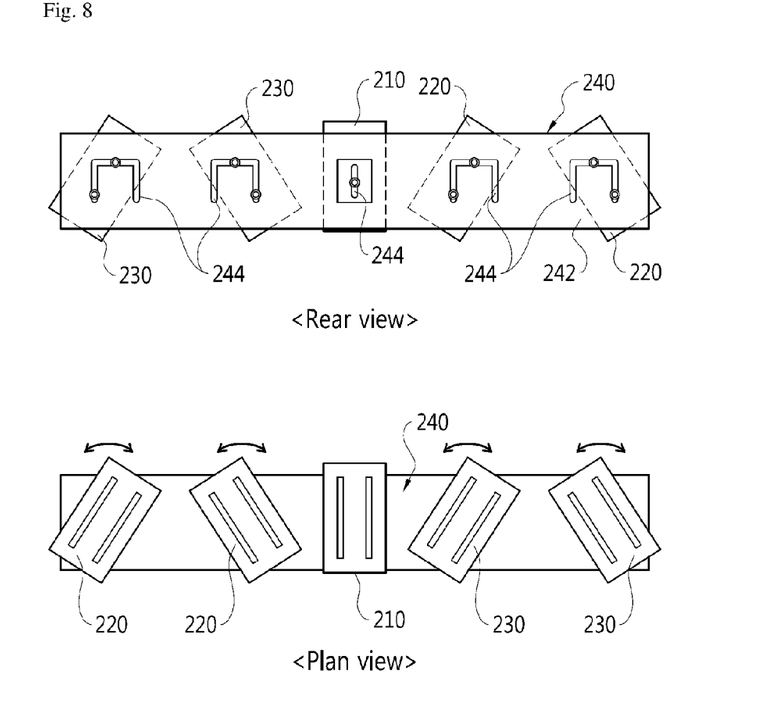
FIG. 8 is an exemplary diagram illustrating a relative movement between the plurality of sliding bases in accordance with an embodiment of the present invention.

For example, as illustrated in FIGS. 7 and 8, in the state in which the plurality of different types of filming devices 110, 120, 120, 130, and 130 has been installed in a plurality of sliding bases 210, 220, 220, 230, and 230 and the plurality of sliding bases 210, 220, 220, 230, and 230 has been installed in such a way as to move on a rig 240, the operation of disposing the plurality of different types of filming devices 110, 120, 120, 130, and 130 at specific angles (i.e., adjacent filming devices is disposed to form a specific included angle) may be implemented by a relative rotary motion between the plurality of sliding bases 210, 220, 220, 230, and 230. In such a case, the rig 240 may include a base plate 242 configured to form a basic body and a plurality of punched units 244 formed in the base plate and configured to have the plurality of sliding bases move. The plurality of sliding bases 210, 220, 220, 230, and 230 move along the paths formed by the punched units 244, thus being capable of implementing relative rotary motions for implementing included angles.

At step S12, in order to synchronize the plurality of different types of filming devices, the shutter operations of the plurality of different types of filming devices are controlled. More specifically, at step S12, the shutter operations of the plurality of different types of filming devices are controlled so that the plurality of different types of filming devices performs their filming operations in the state in which the plurality of different types of filming devices has been synchronized and start frames thereof have been matched.

In such a case, the control of the shutter operations may be performed in the state in which a difference between the operation speeds of the plurality of different types of filming devices has been taken into consideration. More specifically, in order to prevent problems in that the filming operations of types of filming devices are not synchronized and that the start frames of the filming devices are not matched due to a difference between the operation speeds of the filming devices although synchronized start shutter signals (i.e., signals that start the shutters) are transmitted, the shutter operations of the filming devices may be controlled in the state in which a difference between the operation speeds of the filming devices has been taken into consideration. A difference between the operation speeds of filming devices is caused by a difference between types of hardware used in the filming devices and a difference between types of software used in the filming devices. More specifically, a difference between the operation speeds of the filming devices is generated due to factors, such as the signal processing speed of a Central Processing Unit (CPU), a difference in the performance between types of hardware for communication, a difference between networks over which data is transmitted and received, and a difference in the performance between the rolling shutters of respective filming device (i.e., a difference in the frequency/speed of video that is recorded per second). Accordingly, in order to synchronize the filming devices, the start shutter signals may be transferred by taking the aforementioned factors into consideration.

For example, if the shutter operation speed of the main filming device is faster than the shutter operation speeds of the filming devices on the left side and the filming devices on the right side in FIG. 3, start shutter signals transmitted to the filming devices on the left side and the filming devices on the right side may be faster than a start shutter signal transmitted to the main filming device so that the filming operations of the filming devices are synchronized (i.e., a difference between the operation speeds is offset) and the start frames of the filming devices are matched with each other.

At step S13, the plurality of different types of filming devices performs their filming operations in the plurality of viewpoint directions. More specifically, at step S13, the plurality of different types of filming devices performs the filming operations in the plurality of viewpoint directions in the state in which the plurality of different types of filming devices has been disposed at specific angles and has been synchronized (i.e., in the state the start frames of the different types of filming devices have been matched with each other).

At step S14, multi-projection images are generated based on images captured by the plurality of different types of filming devices. More specifically, at step S14, images to be played back in the respective planes (e.g., respective projection planes or planes in which respective display devices have been installed) of a movie theater in which the "multi-projection system" has been constructed are generated based on the images captured by the plurality of different types of filming devices.

In such a case, image data obtained by the plurality of different types of filming devices may be converted into a form having a united color space and format. The color spaces and formats of the image data obtained by the plurality of different types of filming devices need to be united in order to integrate the image data and simultaneously control the image data in a subsequent image processing process (e.g., a process of mapping the image data to a space of a specific form). The image data obtained by the plurality of different types of filming devices may be implemented through a conversion program so that the format of the image data is compatible between the filming devices.

Furthermore, at step S14, the images captured by the plurality of different types of filming devices may be mapped to a spherical space or cylindrical space. After such mapping is performed, images to be played back in the respective planes (e.g., respective projection planes or planes in which respective display devices have been installed) of a movie theater may be generated.

In order to generate multi-projection images having a maximized sense of immersion and 3D effect felt by audiences, an image of each plane needs to be generated by taking the structure of a movie theater into consideration. The reason for this is that in the state in which source images (e.g., images captured by the plurality of different types of filming devices in the present invention) have been mapped to a spherical space or cylindrical space, image regions corresponding to the 3D arrangement states of respective planes (e.g., respective projection planes or planes in which respective display devices have been installed) can be easily specified and allocated.

Figure 9:
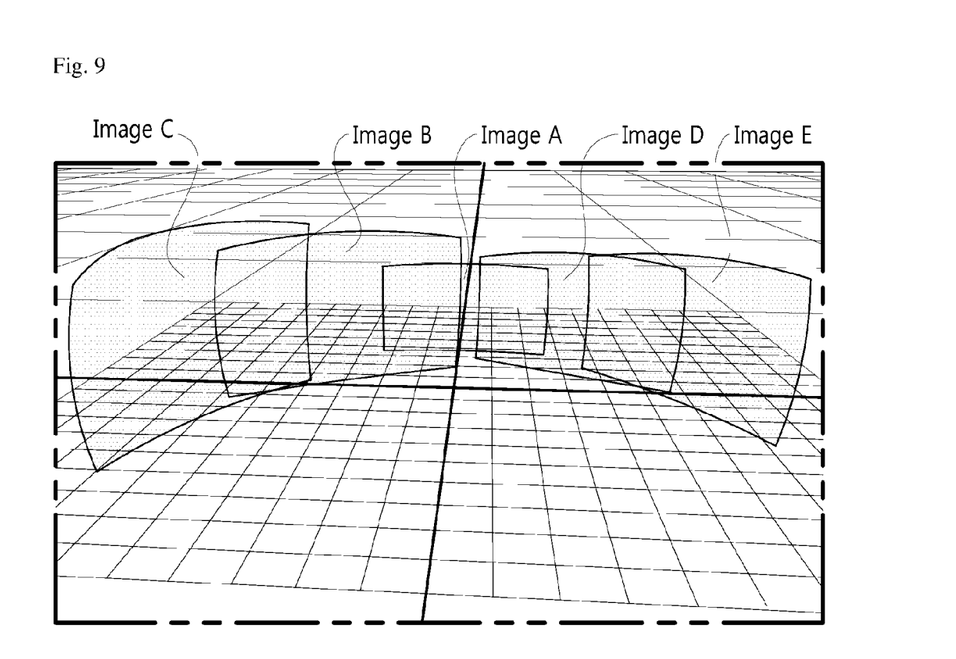
FIG. 9 is an exemplary diagram illustrating that images captured by the plurality of different types of filming devices in accordance with an embodiment of the present invention are mapped to a spherical space.
Figure 10:
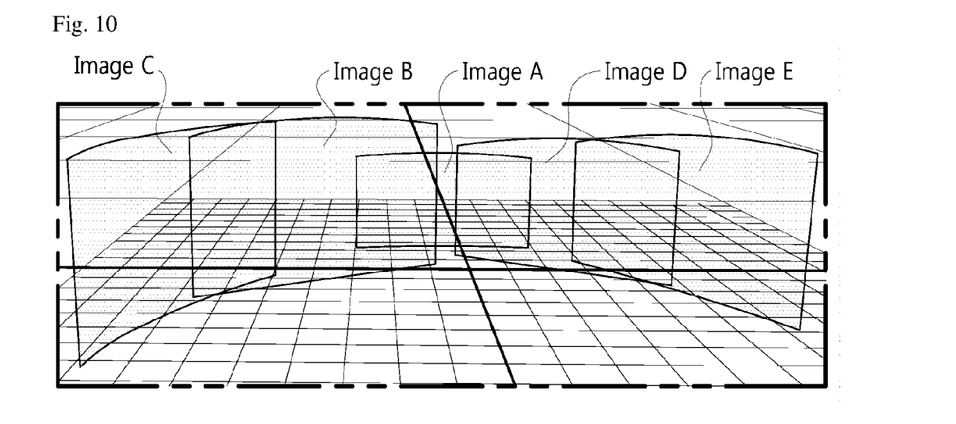
FIG. 10 is an exemplary diagram illustrating that images captured by the plurality of different types of filming devices in accordance with an embodiment of the present invention are mapped to a cylindrical space.

FIG. 9 illustrates that images captured by the plurality of different types of filming devices are together mapped to a spherical space. More specifically, referring to FIG. 9, if the plurality of different types of filming devices includes a main filming device, two filming devices on the left side, and two filming devices on the right side, an image (i.e., an image A) captured by the main filming device, images (i.e., an image B and an image C) captured by the two filming devices on the left side, and images (i.e., an image D and an image E) captured by the two filming devices on the right side are together mapped to the spherical space. Furthermore, FIG. 10 illustrates that images captured by the plurality of different types of filming devices are together mapped to a cylindrical space. More specifically, referring to FIG. 10, if the plurality of different types of filming devices includes a main filming device, two filming devices on the left side, and two filming devices on the right side, an image (i.e., an image A) captured by the main filming device, images (i.e., an image B and an image C) captured by the two filming devices on the left side, and images (i.e., an image D and an image E) captured by the two filming devices on the right side are together mapped to the cylindrical space.

In the method of generating multi-projection images described above in accordance with an embodiment of the present invention, multi-projection images to be played back in the respective projection planes (or respective display devices) of a movie theater in which the multi-projection system has been constructed may be generated based on images captured by the plurality of different types of filming devices. More specifically, the method of generating multi-projection images may include disposing the plurality of different types of filming devices at specific angles, synchronizing the operations of the plurality of different types of filming devices, mapping images captured by the plurality of different types of filming devices to a specific space, specifying image regions corresponding to the arrangement states of respective projection planes (or display devices), and generating so-called "multi-projection images".

A system for generating multi-projection images in accordance with an embodiment of the present invention is described below with reference to FIG. 11.

Figure 11:
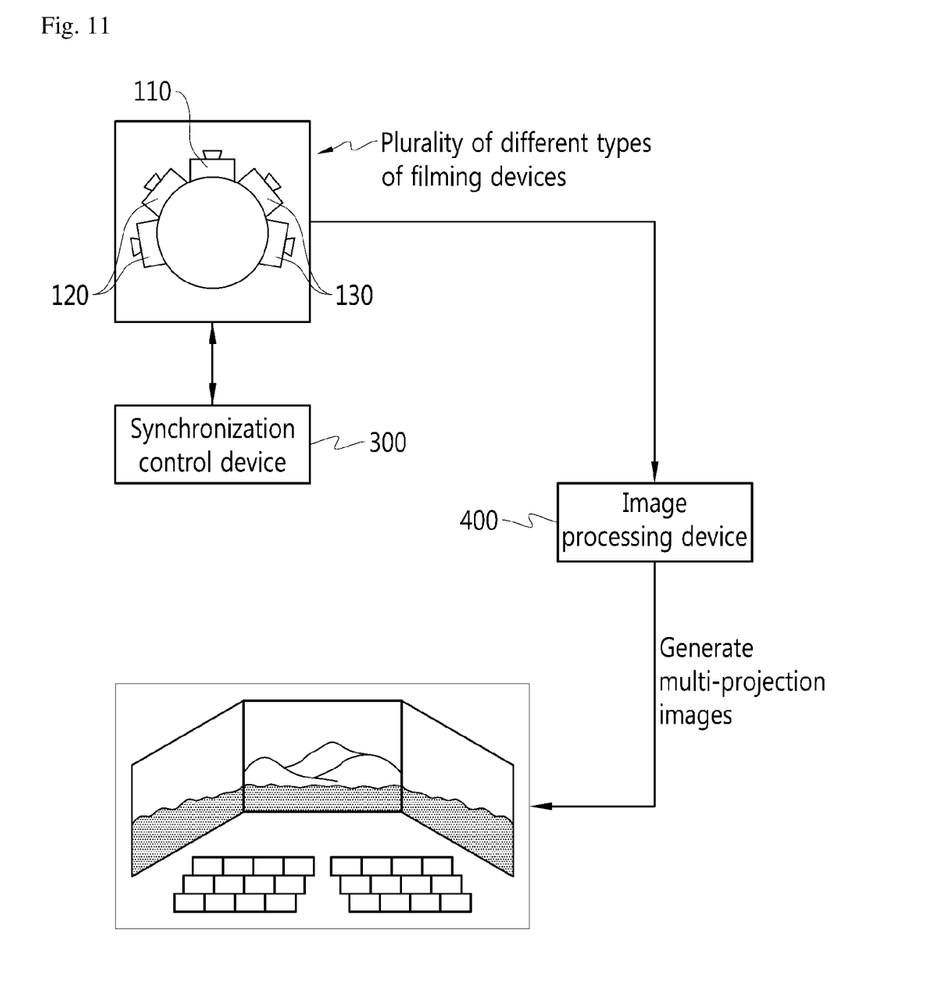
FIG. 11 is a diagram illustrating the configuration of elements that may be included in a system for generating multi-projection images in accordance with an embodiment of the present invention.

Referring to FIG. 11, the system for generating multi-projection images in accordance with an embodiment of the present invention may include a plurality of different types of filming devices disposed at specific angles and configured to perform their filming operations in a plurality of viewpoint directions in the state in which the different types of filming devices have been synchronized, a synchronization control device 300 configured to synchronize the plurality of different types of filming devices by controlling the shutter operations of the plurality of different types of filming devices, and an image processing device 400 configured to map images captured by the plurality of different types of filming devices to a spherical space or cylindrical space and to generate images of respective planes.

The plurality of different types of filming devices corresponds to a filming device group including different types of filming devices. For example, the plurality of different types of filming devices may mean a filming device group configured to include all of different types of filming devices, such as RED Epic and 5D Mark2. The plurality of different types of filming devices may include 5 filming devices. More specifically, the plurality of different types of filming devices may include a main filming device disposed at the center, two filming devices disposed on the left side of the main filming device, and two filming devices disposed on the right side of the main filming device. FIG. 11 illustrates that the plurality of different types of filming devices has been implemented to include the main filming device 110 disposed at the center, the two filming devices 120 disposed on the left side of the main filming device, and the two filming devices 130 disposed on the right side of the main filming device.

In this case, the meaning that the plurality of different types of filming devices is disposed at the specific angles means that adjacent ones of the plurality of different types of filming devices are disposed to form a specific included angle. For example, this means that adjacent ones of filming devices forming the plurality of different types of filming devices form a specific included angle, as illustrated in FIG. 11.

Furthermore, the plurality of different types of filming devices may be disposed so that the angles of view of adjacent filming devices are overlapped.

Furthermore, the plurality of different types of filming devices may be disposed so that they implement an angle of view of 270 degrees or more.

Furthermore, the included angles of the plurality of different types of filming devices (i.e., an included angle between adjacent filming devices) may be controlled depending on the focal distance of a specific filming device. More specifically, if the plurality of different types of filming devices is configured to include a main filming device, two filming devices on the left side of the main filming device, and two filming devices on the right side of the main filming device as illustrated in FIG. 3, the included angles of the plurality of different types of filming devices may be controlled depending on the focal distance of the main filming device.

An operation for disposing the plurality of different types of filming devices at specific angles (i.e., an operation for disposing adjacent filming devices so that they form a specific included angle) may be implemented by various methods, but may be implemented through the structural characteristics of the plurality of sliding bases in which the plurality of different types of filming devices is installed and the rig in which the plurality of sliding bases is formed in such a way as to rotatably move. For example, in the state in which the plurality of different types of filming devices 110, 120, 120, 130, and 130 has been installed in the plurality of sliding bases 210, 220, 220, 230, and 230 and the plurality of sliding bases 210, 220, 220, 230, and 230 has been installed in such a way as to move on the rig 240 as illustrated in FIGS. 7 and 8, the plurality of sliding bases 210, 220, 220, 230, and 230 may perform relative rotary motions so that the plurality of different types of filming devices 110, 120, 120, 130, and 130 are disposed at specific angles (i.e., adjacent filming devices are disposed to form a specific included angle). In such a case, the rig 240 may include the base plate 242 configured to form a basic body and the plurality of punched units 244 formed in the base plate and configured to have the plurality of sliding bases movable in the plurality of punched units 244. The plurality of sliding bases 210, 220, 220, 230, and 230 move along the paths formed by the plurality of punched units 244, thus being capable of implementing relative rotary motions for implementing included angles.

The synchronization control device 300 is configured to synchronize the plurality of different types of filming devices by controlling the shutter operations of the plurality of different types of filming devices. More specifically, the synchronization control device 300 is configured to control the shutter operations of the plurality of different types of filming devices so that the different types of filming devices perform their filming operations in the state in which they have been synchronized and the start frame thereof have been matched. To this end, the synchronization control device 300 may be connected to the different types of filming devices in a wired or wireless way, and it may send a control signal (e.g., a shutter start signal) to each filming device.

Furthermore, the synchronization control device 300 may control the shutter operations of the plurality of different types of filming devices by taking into consideration a difference between the operation speeds of the plurality of different types of filming devices. For example, if the shutter operation speed of the main filming device 110 is faster than the shutter operation speeds of the filming devices 120 on the left side and the filming devices 130 on the right side, the synchronization control device 300 may send start shutter signals faster to the filming devices 120 on the left side and the filming devices 130 on the right side than to the main filming device 110 in order to synchronize the filming operations of the filming devices (i.e., offset a difference between the operation speeds of the filming devices) and to match the start frames of the filming devices with each other.

Furthermore, the synchronization control device 300 may include at least one operation means and at least one storage means. In this case, the operation means may be a general-purpose CPU, but may be a programmable device (e.g., a CPLD or an FPGA), an ASIC, or a microcontroller chip implemented for a specific purpose. Furthermore, the storage means may be a volatile memory device, a non-volatile memory, a non-volatile electromagnetic storage device, or memory within the operation means.

The image processing device 400 is configured to generate multi-projection images based on images captured by the plurality of different types of filming devices. More specifically, the image processing device 400 is configured to generate images to be played back in the respective planes (i.e., projection plane or planes in which respective display devices have been installed) of a movie theater in which the multi-projection system has been constructed by performing an image processing process based on images captured by the plurality of different types of filming devices.

In such a case, the image processing device 400 may perform image processing for converting the color spaces and formats of image data obtained by the plurality of different types of filming devices. More specifically, the image processing device may convert the color spaces and format of obtained image data into a united form.

Furthermore, the image processing device 400 may map images, captured by the plurality of different types of filming devices, to a spherical space or cylindrical space together. After such mapping is performed, the image processing device 400 may generate images corresponding to the respective planes (e.g., respective projection planes or planes in which respective display devices have been installed) of a movie theater.

Furthermore, the image processing device 400 may include at least one operation means and at least one storage means. In this case, the operation means may be a general-purpose CPU, but may be a programmable device (e.g., a CPLD or an FPGA), an ASIC, or a microcontroller chip implemented for a specific purpose. Furthermore, the storage means may be a volatile memory device, a non-volatile memory, a non-volatile electromagnetic storage device, or memory within the operation means.

The system for generating multi-projection images in accordance with an embodiment of the present invention may further include a multi-projection image monitoring device or a multi-projection image simulation device in addition to the aforementioned devices.

The multi-projection image monitoring device is a device for playing back images, captured by the plurality of different types of filming devices, on a virtually reproduced movie theater. The multi-projection image monitoring device functions to enable a user to easily monitor multi-projection images obtained at a filming site.

In this case, a virtual movie theater reproduced on the multi-projection image monitoring device is implemented with reference to a movie theater information database (DB) included in the multi-projection image monitoring device, that is, a DB in which pieces of information (e.g., a screen standard and a movie theater standard) for reproducing a multi-projection movie theater have been stored.

Furthermore, the multi-projection image monitoring device may provide a variety of types of modes so that a user is able to play back an image in a virtual movie theater in various setting modes. For example, the multi-projection image monitoring device may play back multi-projection images by reproducing a virtual movie theater in a basic mode. In this case, the multi-projection image monitoring device may play back only images corresponding to the respective planes (e.g., projection planes on the left side, projection planes on the right side, and a projection plane at the center) of a multi-projection movie theater or may play back multi-projection images in a panorama image form. In this case, a user may increase or decrease the size of each multi-projection image or control the width and height of each multi-projection image by manipulating the multi-projection image monitoring device.

Furthermore, the multi-projection image monitoring device may enable a user to obtain image stitching information, such as information about what part of each image will be overlapped in a subsequent process of stitching images captured by the different types of filming devices and information about an angle between images when the images are overlapped. In this case, virtual stitching results implemented in the multi-projection image monitoring device may be stored in the form of data including numerical values and may be provided so that they are used when an actual stitching task is subsequently performed.

If the multi-projection image monitoring device is used as described above, a user can directly play back images, obtained at a filming site, in a virtual movie theater and monitor the images in real time. In particular, there is an advantage in that a user is able to continue to check whether an intended image complies with an intention of direction because each image can be played back in each mode. Furthermore, there is an advantage in that a content editing step is facilitated because a user may use the results of a stitching task in an actual content editing step using the multi-projection image monitoring device.

The multi-projection image simulation device is a device for playing back a produced multi-projection image in a virtually produced movie theater. In particular, the multi-projection image simulation device is the same as the multi-projection monitoring device in that it refers to information stored in a movie theater information DB when producing a multi-projection image in a virtual movie theater, but is different from the multi-projection monitoring device in that it may reproduce a more realistic and precise movie theater because more information (e.g., a screen standard, a movie theater standard, and interiors/structures/devices attached to the surface of a wall) to which reference is made as parameters.

Like the multi-projection image monitoring device, the multi-projection image simulation device may provide a variety of types of modes so that a multi-projection image can be played back in various setting mode. Furthermore, the multi-projection image simulation device may control a point of view so that a user is able to check the state of a multi-projection image that is being seen depending on a point of view of an audience, that is, the location of a seat.

If such a multi-projection image simulation device is used, there are advantages in that a user can virtually implement an actual screening environment and check the state of a multi-projection image that is played back and a third party, such as an advertiser, can also check the state of content that is being actually played back.

As described above, the system for generating multi-projection images in accordance with an embodiment of the present invention may include substantially the same technical characteristics as the method of generating multi-projection images in accordance with an embodiment of the present invention although they belong to different categories.

Accordingly, although not described in detail in order to avoid redundancy, the characteristics described in relation to the method of generating multi-projection images may also be deduced and applied to the system for generating multi-projection images in accordance with an embodiment of the present invention. Furthermore, on the contrary, the characteristics described in relation to the system for generating multi-projection images may also be deduced and applied to the method of generating multi-projection images.

The aforementioned embodiments of the present invention have been disclosed for illustrative purposes, but the present invention is not restricted by the embodiments. Furthermore, those skilled in the art to which the present invention pertains may modify and change the present invention in various ways within the spirit and scope of the present invention, and such modifications and changes should be construed as falling within the scope of the present invention.

The invention claimed is:

1. A method of generating multi-projection images, the method comprising:
controlling a plurality of different types of filming devices to dispose the plurality of different types of filming devices at specific angles based on a point;
controlling shutter operations of the disposed plurality of different types of filming devices to synchronize the plurality of different types of filming devices; and
controlling the plurality of different types of filming devices to perform filming operations in a plurality of viewpoint directions,
wherein the plurality of different types of filming devices is disposed so that angles of view of adjacent filming devices are overlapped,
wherein the point is located, at the same distance from each filming device of the plurality of different types of filming devices, on each linear axis passing through a center of the each filming device, and
wherein two line segments, forming an angle of view of a filming device among the plurality of different types of filming devices, pass through points on linear axis of adjacent filming devices on a left and a right sides of the filming device, respectively.

2. The method of claim 1, wherein the disposed plurality of different types of filming devices forms an angle of view of 270 degrees or more in combination with thereof.

3. The method of claim 1, wherein the plurality of different types of filming devices is installed in a plurality of sliding bases and disposed at the specific angles through relative motions between the plurality of sliding bases.

4. The method of claim 1, wherein the plurality of different types of filming devices comprise:
a main filming device disposed at a center;
two filming devices disposed on a left side of the main filming device; and
two filming devices disposed on a right side of the main filming device.

5. The method of claim 4, wherein if a focal distance of any one filming device of the plurality of different types of filming devices is increased, the plurality of different types of filming devices is disposed again so that a first included angle between the any one filming device and a first adjacent filming device adjacent to the any one filming device on the left side and a second included angle between the any one filming device and a second adjacent filming device adjacent to the any one filming device on the right side are reduced.

6. The method of claim 4, wherein:
a focal distance of the main filming device is 24 mm, and
a focal distance of each of the filming device on the left side and the filming device on the right side is 16 mm.

7. The method of claim 1, wherein in controlling the shutter operations, if the plurality of different types of filming devices has different operation speeds, start shutter signals are transmitted to the plurality of different types of filming devices with a time lag.

8. The method of claim 7, wherein the time lag between the start shutter signals transmitted to the plurality of different types of filming devices is computed by taking into consideration at least one of a signal processing speed of a Central Processing Unit (CPU) included in each filming device, a network transfer speed used by each filming device when data is transmitted and received, and a processing speed of a rolling shutter between the filming devices.

9. The method of claim 1, further comprising mapping images captured by the plurality of different types of filming devices to a spherical space or cylindrical space and generating images of respective planes.

10. The method of claim 9, wherein mapping the images comprises converting color spaces and formats of the images captured by the plurality of different types of filming devices into a united form.

11. A system for generating multi-projection images, the system comprising:
a plurality of different types of filming devices disposed at specific angles based on a point and configured to perform filming operations in a plurality of viewpoint directions in a state in which the different types of filming devices have been synchronized; and
a synchronization control device configured to synchronize the plurality of different types of filming devices by controlling shutter operations of the plurality of different types of filming devices,
wherein the plurality of different types of filming devices is disposed so that angles of view of adjacent filming devices are overlapped,
wherein the point is located, at the same distance from each filming device of the plurality of different types of filming devices, on each linear axis passing through a center of the each filming device, and
wherein two line segments, forming an angle of view of a filming device among the plurality of different types of filming devices, pass through points on linear axis of adjacent filming devices on a left and a right sides of the filming device, respectively.

12. The system of claim 11, wherein
the adjacent filming devices of the plurality of different types of filming devices are disposed to form a specific included angle, and
the plurality of different types of filming devices is configured to form an angle of view of 270 degrees or more in combination with thereof.

13. The system of claim 11, further comprising:
a rig;
a plurality of sliding bases installed in the rig and configured to
receive the plurality of different types of filming devices, respectively, and
rotatably move in the rig; and
wherein the plurality of different types of filming devices is disposed at the specific angles through relative motions between the plurality of sliding bases.

14. The system of claim 13,
wherein the rig comprises
a base plate, and
a plurality of punched portions formed in the base plate and configured to receive the plurality of sliding bases,
wherein the plurality of sliding bases is configured to rotatably move, through the plurality of punched portions, in the base plate.

15. The system of claim 11, wherein the plurality of different types of filming devices comprises:
a main filming device disposed at a center;
two filming devices disposed on a left side of the main filming device; and
two filming devices disposed on a right side of the main filming device.

16. The system of claim 11, further comprising an image processing device configured to map images, captured by the plurality of different types of filming devices, to a spherical space or cylindrical space and to generate images of respective planes.

17. The system of claim 16, wherein the image processing device converts color spaces and formats of the images, captured by the plurality of different types of filming devices, into a united form and performs the mapping operation.

\* \* \* \* \*